(12) United States Patent  
Yanagi

(10) Patent No.: US 8,249,313 B2  
(45) Date of Patent: Aug. 21, 2012

(54) IMAGE RECOGNITION DEVICE FOR PERFORMING IMAGE RECOGNITION INCLUDING OBJECT IDENTIFICATION ON EACH OF INPUT IMAGES

(75) Inventor: Kazunori Yanagi, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 1002 days.

(21) Appl. No.: 12/235,827

(22) Filed: Sep. 23, 2008

(65) Prior Publication Data

US 2009/0080716 A1    Mar. 26, 2009

(30) Foreign Application Priority Data

Sep. 25, 2007    (JP) .................................. 2007-246552

(51) Int. Cl.  
*G06K 9/62* (2006.01)
(52) U.S. Cl. ........................................................ 382/118
(58) Field of Classification Search .................. None  
See application file for complete search history.

(56) References Cited

U.S. PATENT DOCUMENTS

| | | | | |
|---|---|---|---|---|
| 6,393,139 | B1 * | 5/2002 | Lin et al. ....................... | 382/124 |
| 7,272,246 | B2 * | 9/2007 | Li et al. ........................ | 382/116 |
| 2002/0176609 | A1 * | 11/2002 | Hsieh et al. .................... | 382/118 |
| 2006/0177108 | A1 | 8/2006 | Yashiki | |
| 2007/0291998 | A1 * | 12/2007 | Takizawa et al. ............. | 382/118 |

FOREIGN PATENT DOCUMENTS

| | | |
|---|---|---|
| JP | 2000-306095 A | 11/2000 |
| JP | 2001-043191 A | 2/2001 |
| JP | 2003-248661 A | 9/2003 |
| JP | 2005-202673 A | 7/2005 |
| JP | 2006-221411 A | 8/2006 |

OTHER PUBLICATIONS

Japanese Office Action dated Jan. 12, 2010 and English translation thereof issued in counterpart Japanese Application No. 2007-246552.

* cited by examiner

*Primary Examiner* — Brian P Werner  
(74) *Attorney, Agent, or Firm* — Holtz, Holtz, Goodman & Chick, PC

(57) ABSTRACT

A digital camera picks up an image of an object for face authentication prior to each of, for example, continuous photographing operations, and operates as follows if performing an actual photographing process only when a face of a designated person can be recognized in the acquired image. If the face of the designated person can be recognized at an arbitrary timing and the actual photographing process is performed, the digital camera changes a plurality of recognition conditions at the arbitrary timing, thereby reducing face recognition accuracy used if the face of the designated person is recognized at a time of second and following face recognitions. By reducing the face recognition accuracy, the second and following face recognitions can be performed at high speed. Besides, since the designated person can be recognized once during the previous face recognition, similar recognition accuracy to the unchanged and unreduced recognition accuracy (without changing the face recognition conditions) can be substantially ensured.

15 Claims, 5 Drawing Sheets

IMAGE RECOGNITION DEVICE FOR PERFORMING IMAGE RECOGNITION INCLUDING OBJECT IDENTIFICATION ON EACH OF INPUT IMAGES

CROSS REFERENCE TO RELATED APPLICATIONS

This application is based upon and claims the benefit of priority from a Japanese Patent Application No. TOKUGAN 2007-246552, filed on Sep. 25, 2007; the entire contents of which are incorporated herein by reference.

BACKGROUND OF THE INVENTION

1. Field of the Invention

The present invention relates to an image recognition device, an image recognition method, and an image recognition program suited for use in a face authentication process on, for example, a photographed image.

2. Description of the Related Art

Conventionally, a face authentication process on a photographed image is performed by identifying the face of which of persons registered in advance the face of a person present in the photographed image corresponds to. Various image recognition techniques are employed for this face recognition. Basically, in general, as disclosed in Japanese Patent Application Laid-Open No. 2000-306095, there is a technique for (1) performing face detection for extracting an image corresponding to a face part of a person from each of photographed images, (2) comparing the detected image corresponding to the face part with each of a plurality of face images registered (stored) in advance, and (3) searching the face image a matching degree of which is equal to or higher than a standard.

To improve accuracy of the face authentication process, that is, to improve accuracy of the face recognition process including object identification, it is desirable to store a plurality of types of face images in varied states as recognition candidates for each of registered persons in advance. However, if the number of recognition candidates per person increases, then processing load required for the face recognition disadvantageously increases and it disadvantageously takes a longer time for the face recognition process. That is, in a case of a device having a fixed processing capability, authentication accuracy and authentication speed are in a tradeoff relationship. Particularly if the face recognition process is repeatedly performed, it is disadvantageously difficult to simultaneously satisfy authentication accuracy and authentication speed.

SUMMARY OF THE INVENTION

The present invention is characterized such that in an image recognition process of repeatedly performing image recognition including object identification on each of continuously input images, a specific recognition target registered in advance is recognized according to a predetermined recognition condition from each of the continuously input images, and a content of the predetermined recognition condition is changed in response to recognition of the specific recognition target in one of the continuously input images.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION OF THE PREFERRED EMBODIMENTS

Figure 1:
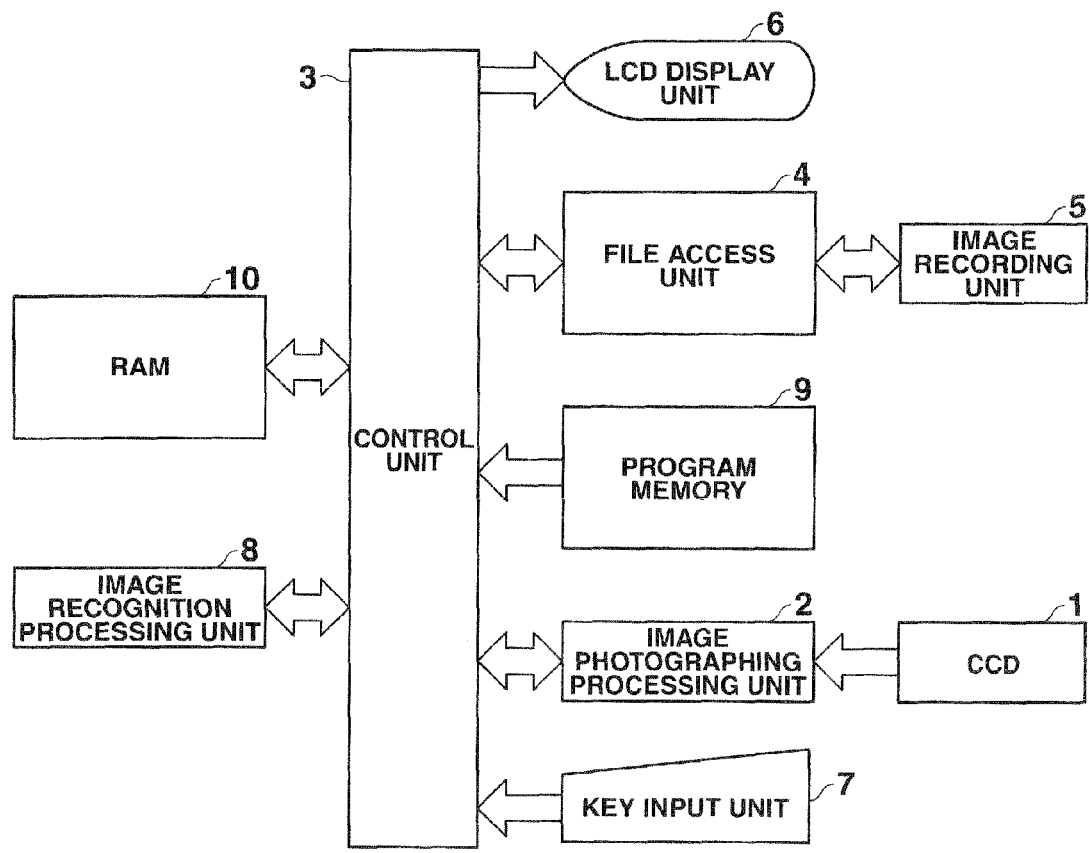
FIG. 1 is a block diagram showing a configuration of a digital camera according to an embodiment of the present invention.

Preferred embodiments of the present invention will be explained below with reference to the drawings. FIG. 1 is a block diagram showing a schematic configuration of a digital camera including an image recognition device according to an embodiment of the present invention.

The digital camera includes a CCD 1 and an image photographing processing unit 2. The image photographing processing unit 2 includes various signal processing circuits for converting an output signal (a photograph signal output) from a drive circuit of the CCD 1 or from the CCD 1 into digital data, performing various processes on the digital data, and generating image data (YUV data) on an object image picked up by the CCD 1.

The image data generated by the image photographing processing unit 2 is transmitted to a control unit 3. In a recording mode, the image data is finally recorded in an image recording unit 5 as an image file via a file access unit 4. The image recording unit 5 is an arbitrary recording medium such as a memory card of various types attachable/detachable to or from the digital camera. The file access unit 4 is an interface circuit for inputting or outputting image data to or from the image recording unit 5 serving as the recording medium.

The control unit 3 is configured to mainly include a CPU and peripheral circuits of the CPU and controls the overall operation preformed by the digital camera. The control unit 3 includes a CODEC (coder-decoder) compressing or expanding image data and performs both an image data compression process in the recording mode and a compressed data expansion process in a reproduction mode for reproducing a recorded image.

The digital camera 1 includes an LCD display unit 6, a key input unit 7, an image recognition processing unit 8, a program memory 9, and a RAM 10.

The LCD display unit 6 displays an image based on image data read from the image recording unit 5 in the reproduction mode. The LCD display unit 6 functions as an electronic view finder by displaying a through-the-lens image of an object based on the image data generated by the image photographing processing unit 2 in a shooting standby state in the recording mode. The LCD display unit 6 displays various setting screens for causing a user to set contents of a digital camera operation according to need.

The key input unit 7 is configured to include a plurality of keys such as a mode switch key for switching over an operation mode of the digital camera between the recording mode for photographing and the reproduction mode for displaying the recorded image and a shutter key. The control unit 3 sequentially detects an operation state of each of the keys.

The image recognition processing unit 8 detects a face part of a person from the image data (object image) on the object picked up by the CCD 1 and generated by the image photographing processing unit 2 by performing an image recognition process such as binarization, profile extraction or pattern matching on the image data (object image), and performs a face recognition process including object identification on the detected face part. Details of the face recognition process will be described later.

Figure 2:
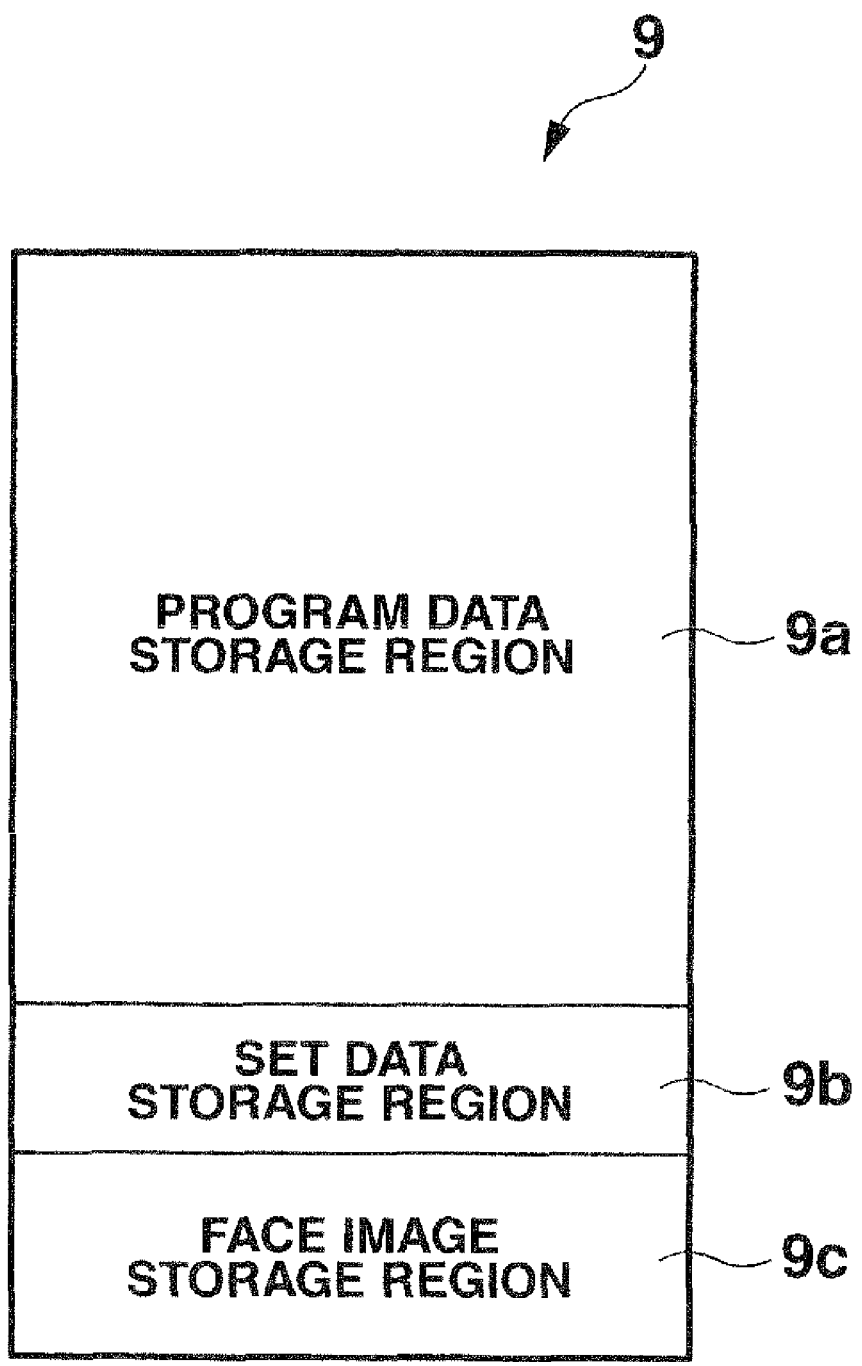
FIG. 2 is a conceptual diagram showing a memory region in a program memory shown in FIG. 1.

The program memory 9 is a nonvolatile memory capable of programming stored data. As shown in FIG. 2, a program data storage region 9a, a set data storage region 9b, and a face image storage region 9c are secured in the program memory 9.

The program data storage region 9a stores therein various programs including an image recognition program for causing the control unit 3 to control the constituent elements of the digital camera and various pieces of data accompanying the programs.

The set data storage region 9b stores therein various pieces of set data on contents of the digital camera operation. The set data is appropriately rewritten data such as user's set data or automatically set data.

The face image storage region 9c stores therein images registered by the user. The registered images are image data on the face of a specific person (recognition candidate) to be recognized from the image data on the object (object image). Alternatively, the face image storage region 9c can be secured in the image recording unit 5.

The RAM 10 is a working memory for the control unit 3. The RAM 10 stores therein not only the data generated at the time of the control over the digital camera but also YUV data before compression, YUV data after expansion and the like obtained when the control unit 3 performs image data compression or expansion.

Operations performed by the digital camera configured as described above will next be described.

(Face Registration Mode)

Figure 3:
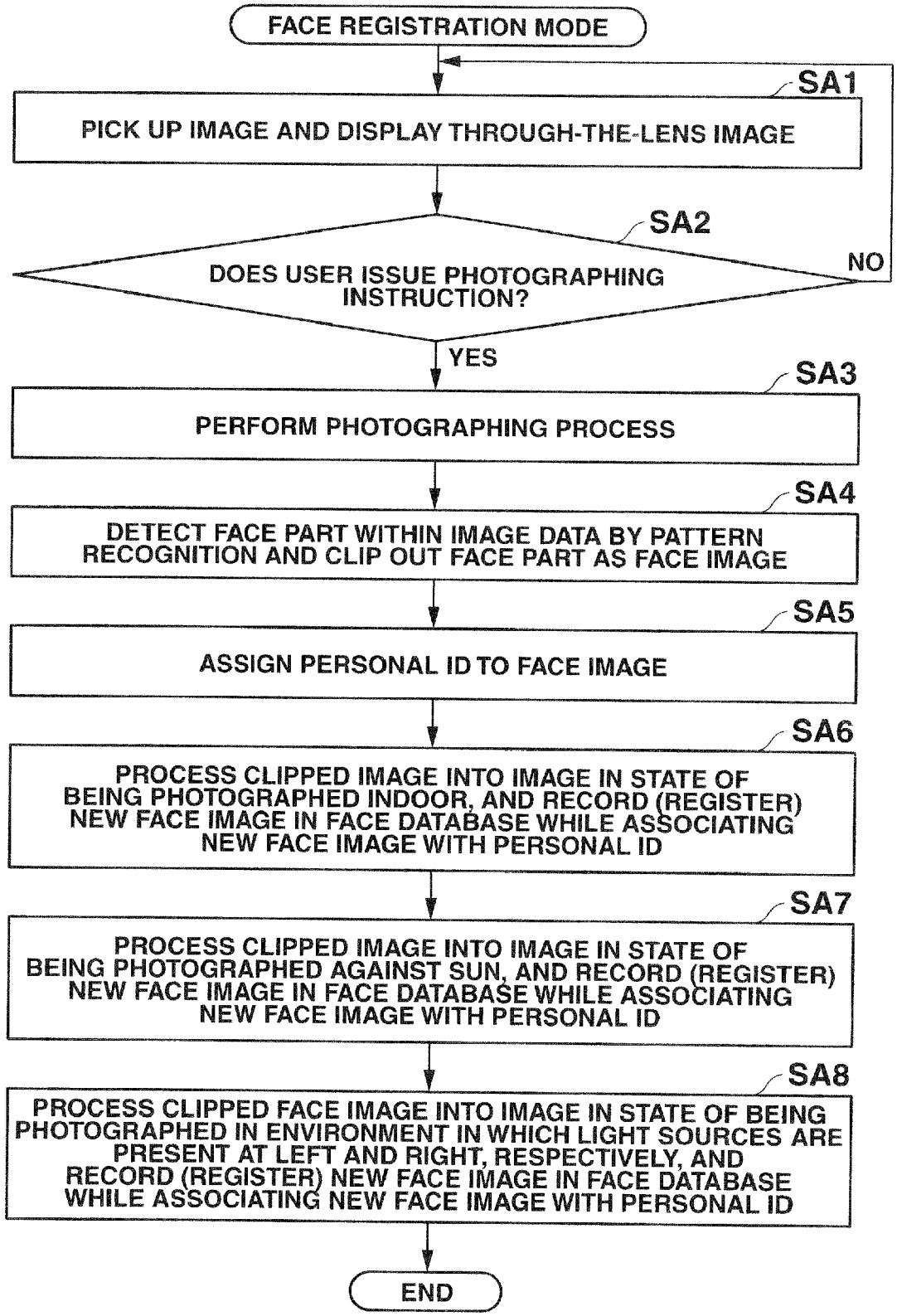
FIG. 3 is a flowchart showing an operation performed by a digital camera in a face registration mode.

The operation performed by the digital camera when a face registration mode prepared as a lower mode of the recording mode is selected is described below. FIG. 3 is a flowchart showing contents of processes performed by the control unit 3 when the face registration mode is selected.

When the face registration mode is selected, the control unit 3 instantly starts controlling the CCD 1 to pick up an image and the LCD display unit 6 to display a through-the-lens image (step SA1). The control unit 3 repeatedly controls the CCD 1 and the LCD display unit 6 to pick up the image and display (update) the through-the-lens image at a predetermined frame rate, respectively until the user issues a photographing instruction by user's operating the shutter key (step SA2, NO). During that time, the control unit 3 controls the LCD display unit 6 to display a message or the like to encourage the user to photograph the face of a person to be registered.

Thereafter, if the user issues the photographing instruction (step SA2, YES), the control unit 3 performs a photographing process (controls the CCD 1 to perform an operation for picking up an image to be recorded) to acquire an object image (step SA3). The control unit 3 controls the image recognition processing unit 8 to perform a face recognition process based on pattern data prepared in advance. By performing the face recognition process, a face part within the photographed image is detected and the face part is clipped out from the photographed image as a face image (step SA4).

The control unit 3 assigns a personal ID to the clipped face image (step SA5). The control unit 3 processes the clipped image into an image in a state of being photographed indoor by adjusting white balance of the clipped face image. The control unit 3 records (registers) the new face image obtained by the process in the face image storage region 9c (hereinafter, "face database") of the program memory 9 while associating the new face image with the personal ID (step SA6).

The control unit 3 processes the clipped image into an image in a state of being photographed against the sun by adjusting a contrast of the face image clipped out in the step SA4. The control unit 4 records (registers) the new face image obtained by the process in the face database while associating the new face image with the personal ID (step SA7). The control unit 3 processes the clipped face image into an image in a state of being photographed in environment in which light sources are present at the left and right, respectively by making a contrast adjustment and a brightness adjustment for shading the face image clipped out in the step SA4 horizontally. The control unit 3 records (registers) the new face image obtained by the process in the face database while associating the new face image with the personal ID (step SA8).

In this way, the control unit 3 generates four types of new face images by performing different processing treatments on the face image of the same person and records the face images in the face database while associating each of the face images with the personal ID. Thus, the process accompanying one photographing operation in the face registration mode is finished.

Thereafter, the control unit 3 repeatedly performs the processes described above until the user changes the face registration mode to another mode. During that time, the control unit 3 sets a new personal ID whenever a new face image is clipped out to follow photographing. Each face image is associated with the personal ID by, for example, creating a table showing the correspondence between a data name of each face image and the personal ID in the face database.

Accordingly, by using the face registration mode, the user can easily record a plurality of types of face images for a desired person only by photographing the desired person in an arbitrary photographic environment once similarly to an instance of photographing the person in different photographic environments a plurality of times.

In the present embodiment, the control unit 3 performs the face detection process on the photographed image and thereby automatically identifies the face part to be stored as the face image in the photographed image. Alternatively, the control unit 3 can temporarily display the photographed image on the LCD display unit 6 and can cause the user to manually designate the face part (face region) to be stored as the face image by a predetermined key operation in the state of displaying the photographed image on the LCD display unit 6.

If a plurality of face parts of persons is detected from the photographed image in the case of automatically identifying the face part to be stored as the face image in the photographed image as described in the present embodiment, the control unit 3 can generate and store four types of new face images, as described above, for each of all the detected face parts. Alternatively, the control unit 3 can cause the user to designate a desired one face part from the detected face parts and can generate and store four types of new face images only for the designated face part.

In the present embodiment, the face part detected from the photographed image is subjected to processing treatments corresponding to pseudo photographic environments and four types of new face images are generated and stored. However, the number of newly generated face images and types of the face images (contents of the processing treatments) can be arbitrarily set.

In the case of the digital camera according to the embodiment, the user can store a face image in the face database (the face image storage region 9c) by methods other than the method using the face registration mode. Although not shown in the drawings, one of the methods other than that using the face registration mode will be described. When the user performs a key operation for instructing registration of a person while an image automatically reproduced right after being photographed in the ordinary recording mode or a recorded image designated in the reproduction mode is being displayed on the LCD display unit 6, the control unit 3 (1) causes the user to designate the face part of the person in the displayed image by a predetermined key operation, (2) clips out image data on the designated face part, and (3) stores the clipped image data in the face database as a face image.

At the time of storing the face image, the control unit 3 causes the user to select whether to record the clipped image while associating the clipped image with a newly assigned personal ID or an existing personal ID. If the user selects the former option, the control unit 3 stores the clipped face image in the face database while associating the clipped face image with a newly assigned personal ID. If the user selects the latter option, the control unit 3 causes one or a plurality of face images stored to be associated with each of existing personal IDs to be displayed on the screen for every existing personal ID, causes the user to designate an arbitrary personal ID (registered person) once, and then stores the clipped face image in the face database while associating the clipped face image with the designated personal ID.

(Photographic Mode with Face Authentication)

Operations performed by the digital camera in a photographic mode with face authentication will be described below. The photographic mode with face authentication is a mode prepared in advance as a lower mode of the recording mode. The photographic mode with face authentication is used if the user photographs one or a plurality of desired and specific persons among those registered in advance as a main object.

It is assumed hereafter that face images of a plurality of persons is stored in the face image storage region 9c of the program memory 9 and that those face images include a plurality of types of face images per person such as four types of face images acquired using the face registration mode and different in photographic environment and face images (such as images of straight face, tearful face, and angry face) acquired without using the face registration mode and different in expression.

Figure 4:
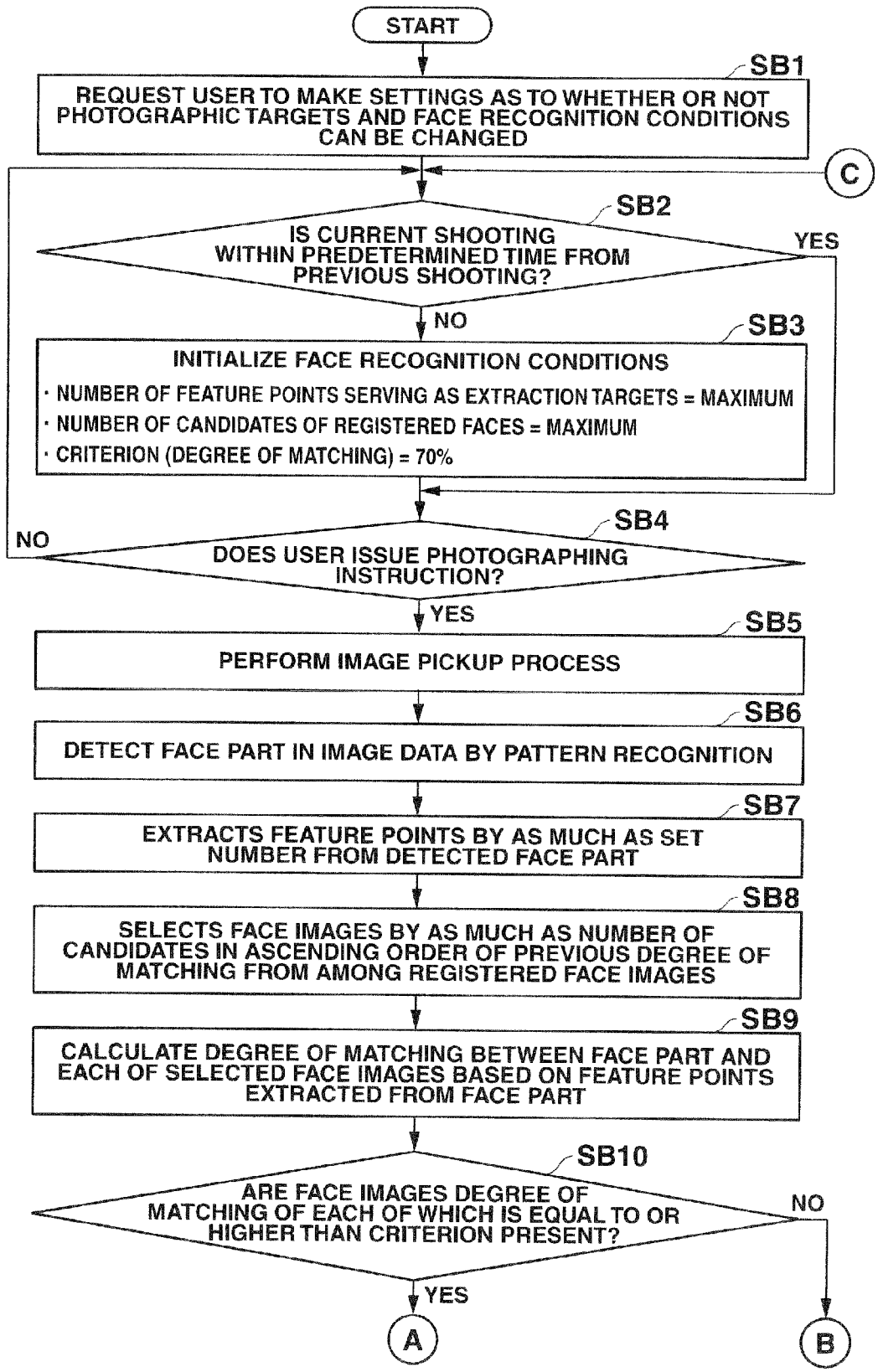
FIG. 4 is a flowchart showing an operation performed by the digital camera in a photographic mode with face authentication.
Figure 5:
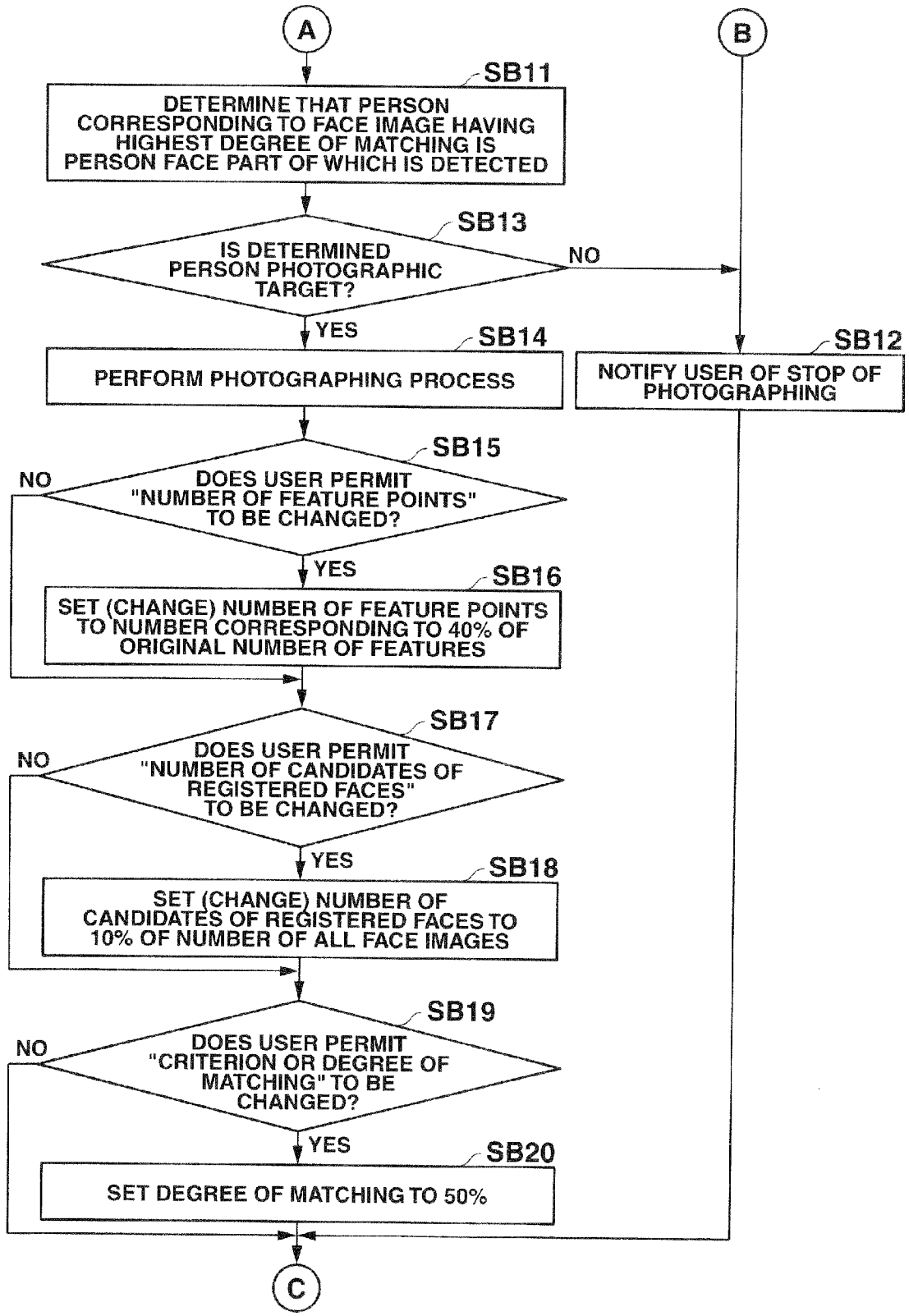
FIG. 5 is a flowchart continued from the flowchart of FIG. 4.

FIGS. 4 and 5 are flowcharts showing an operation performed by the digital camera when the photographic mode with face authentication is selected.

As shown in FIG. 4, when the photographic mode with face authentication is set in the digital camera, the control unit 3 displays a predetermined setting screen on the LCD display unit 6 to thereby request the user to make settings as to whether or not one or a plurality of specific persons as photographic targets and face recognition conditions can be changed, and stores contents set by the user in the RAM 10 (step SB1).

The face recognition conditions define contents of a face recognition process performed by the face recognition processing unit 8. Specific face recognition conditions that can be set to be changed include the number of feature points to serve as extraction targets from the face part in the image to be described later, the number of candidates of registered faces (face images) as comparison targets, and a criterion (degree of matching). At the time of setting related to the specific person in the step SB1, the control unit 3 displays one or a plurality of face images stored to be associated with each of registered personal IDs on the screen, causes the user to designate an arbitrary person, and stores the personal ID of the designated person.

Next, the control unit 3 determines whether or not current shooting is within a predetermined time (for example, 10 seconds) from previous shooting (step SB2). At the beginning of the operation in the photographic mode with face authentication, a result of the determination process is NO. Therefore, the control unit 3 initializes the face recognition conditions, respectively (step SB3). Namely, the control unit 3 sets each of the number of feature points, the number of candidates, and the number of registered faces (face images) as comparison targets to "maximum" and sets the criterion to "70%". That is, the control unit 3 sets recognition accuracy for recognizing the face of the designated specific person to highest recognition accuracy.

Thereafter, the control unit 3 determines whether or not the user issues a photographing instruction by user's operating the shutter key. Before the user issues the photographing instruction (step SB4, NO), the control unit 3 maintains the shooting standby state. When the user issues the photographing instruction (step SB4, YES), the control unit 3 controls the CCD 1 to pick up an image of an object at the instance of the instruction and stores picked-up image data on the object in the RAM 10 (step SB5).

The image recognition processing unit 8 performs the following image recognition process. The image recognition processing unit 8 detects a face part in the picked-up image data by pattern recognition (step SB6) and extracts feature points by as much as the set number from the detected face part (step SB7). Further, the image recognition processing unit 8 selects face images by as much as the set number of candidates in an ascending order of previous degree of matching from among the face images registered in the face database (step SB8). At the beginning of the operation in the photographic mode with face authentication, the number of feature points extracted in the step SB7 is "maximum" and the number of candidates of face images selected in the step SB8 is also "maximum", that is, all the face images are candidates.

The image recognition processing unit 8 calculates a degree of matching between each of the selected face images (all face images) and the detected face part based on the feature points extracted from the detected face part (step SB9). A calculation result for each face image is temporarily stored in the RAM 10.

The image recognition processing unit 8 determines whether or not the face images the calculated degrees of matching of which are equal to or higher than the criterion (70%) are present. If the face images the calculated degrees of matching of which are equal to or higher than the criterion (70%) are not present (step SB10, NO), the control unit 3 notifies the user of stop of photographing in response to the present photographing instruction (step SB12) and the process returns to the step SB2. The user is notified of the stop of photographing by, for example, displaying a predetermined message for notifying the user of the stop of photographing on the LCD display unit 6.

If the face images the calculated degrees of matching of which are equal to or higher than the criterion (70%) are present (step SB10, YES), the image recognition processing unit 8 determines that a person corresponding to the face image having the highest degree of matching among those having the degrees of matching equal to or higher than the criterion is the person for which the face part is detected (the person in the image) (step SB11) as shown in FIG. 5, and identifies the personal ID with which the face image having the highest degree of matching is associated (step SB12).

Furthermore, the image recognition processing unit 8 determines whether or not the determined person is a photographing target, that is, performs a face authentication by determining whether or not the identified personal ID is equal to the personal ID stored in the step SB1 (step SB13). If the person is not the photographing target (step SB13, NO), the control unit 3 notifies the user of the stop of photographing in response to the current photographing instruction (step SB12) and the process returns to the step SB2. Namely, if the person designated as the photographing target is, for example, not present within an angle of view or present within the angle of view but turns his or her head away, unnecessary image recording is avoided by automatically stopping photographing despite the photographing instruction.

If the determined person within the angle of view is the photographing target (step SB13, YES), the control unit 3 performs an actual photographing process, that is, an image pickup process toward recording by the CCD 1, compresses the picked-up image data, and records the compressed data in the image recording unit 5 (step SB14).

After the photographing process, if the user permits "the number of feature points" in the face recognition conditions to be changed, the control unit 3 changes the number of feature points to the number corresponding to 40% of the original number (step SB15, YES and step SB16). If the user permits "the number of candidates of registered faces" in the face recognition conditions to be changed, the control unit 3 changes the number of candidates of registered faces to the number corresponding to 10% of the number of all face images (step SB17, YES and step SB18). If the user permits the "criterion, i.e., degree of matching" to be changed, the control unit 13 changes the criterion to 50% (step SB19, YES and step SB20). Namely, the control unit 3 makes a setting of reducing the recognition accuracy by decreasing man-hour for the recognition process in the first recognition process at the time of recognizing the face of the designated person. (The setting is intended for a second and subsequent recognition processes. Therefore, even if the recognition accuracy in the first recognition process is reduced, the recognition accuracy at the time of recognizing the face of the designated person is not reduced.) Thereafter, the process returns to the step SB2.

Thereafter, if the user issues a photographing instruction by the shutter key again within a predetermined time from the previous shooting, that is, within a predetermined time since the designated person can be recognized in a state in which the user permits any of the face recognition conditions to be changed (step SB2, YES and step SB4, YES), the control unit 3 acquires an image by a new imaging operation and performs a process of recognizing the designated person with the changed lower recognition accuracy on the acquired image (steps SB5 to SB11). Only if the designated person is recognized, the control unit 3 performs the actual photographing process (the photographing process accompanied by recording to the image recording unit 5) (step SB13, YES and step SB14).

On the other hand, if the predetermined time passes from the previous shooting before the photographing instruction by the shutter key is issued again even in the state in which the user permits any of the face recognition conditions to be changed (step SB2, NO), the control unit 3 initializes the face recognition conditions at the time of passage of the predetermined time and returns the recognition accuracy to the highest state (step SB3).

If the user issues the photographing instruction by the shutter key (step SB2, YES and step SB4, YES), the control unit 3 acquires an image by a new imaging process and performs a process of recognizing the designated person with the highest recognition accuracy on the acquired image (steps SB5 to SB11) Only if the specific person can be recognized, the control unit 3 performs the actual photographing process (step SB13, YES and step SB14). Subsequently, the control unit 3 performs the above-described processes while the photographic mode with face authentication is set.

As described above, in the photographic mode with face authentication, the control unit 3 of the digital camera according to the embodiment of the present invention picks up the image of the object for the face authentication process once in response to the photographing instruction by the shutter key, and performs the actual photographing operation only if the designated person can be recognized in the acquired image. It is thereby possible to avoid unnecessary image recording. Furthermore, in this case, if the user issues a photographing instruction again within the predetermined time from the previous shooting, i.e., within the predetermined time since the designated person can be previously recognized, the control unit 3 changes the face recognition conditions and performs the face recognition (face authentication) while reducing the recognition accuracy. It is thereby possible to perform the face authentication at higher speed than the previous speed. Besides, the designated person can be already recognized during the previous face authentication and passage of time from the previous shooting is short. Due to this, there is high probability that the same person is still present in a photographic frame at the current shooting, and similar recognition accuracy to that in the first recognition process, that is, similar recognition accuracy to the unchanged and unreduced recognition accuracy (without changing the face recognition conditions) can be substantially ensured. That is, if the image recognition including object identification is repeatedly preformed, the recognition accuracy for the object and the recognition speed can be simultaneously satisfied.

In the present embodiment, the face recognition conditions that define the contents of the face recognition operation performed by the face recognition processing unit 8 are the number of feature points serving as extraction targets from the face part in the image, the number of candidates of registered faces (face images) as comparison targets, and the criterion (degree of matching). The user is allowed to set whether or not the face recognition conditions can be changed individually. Alternatively, the digital camera can be configured to cause the user to collectively set whether or not the face recognition conditions can be changed or configured to change the face conditions unconditionally according to need. Further, the face recognition conditions to be changed according to need can be limited only to, for example, the number of feature points. Nevertheless, to accelerate the recognition speed by the change in the face recognition conditions, it is preferable that a plurality of face recognition conditions is changed according to need.

In the present embodiment, it is described that in the photographic mode with face authentication for performing face recognition of the person designated in advance just before the actual photographing process is performed in response to the user's photographing instruction, the recognition accuracy for the face of the designated person if the face recognition is continuously performed and the recognition speed at the time of the face recognition are simultaneously satisfied. Alternatively, the present invention is applicable to the following instance.

For example, the digital camera is caused to perform a photographing operation with one or a plurality of designated persons set as a main object from among the persons registered in advance (photographing process that is not accompanied by the recording to the image recording unit 5) automatically and continuously at relatively short time intervals. In this case, prior to each photographing operation, the face recognition of the person within the angle of view is repeatedly performed. Only if one or a plurality of designated persons can be recognized, the actual photographing operation (the photographing process accompanied by the recording to the image recording unit 5) is performed.

Specifically, in a series of processes shown in FIGS. 4 and 5, the processes in the steps SB4 and SB12 shown in FIG. 4 are eliminated, a step of confirming whether or not the user issues a photographing start instruction is added right after the step SB1, and the processes in the step SB2 and the following steps can be performed.

The present invention is not limited to the face recognition for determining whether or not photographing can be performed as described above, but is also applicable to instances of continuously performing face recognition for other purposes. For example, the present invention is applicable to the following instance. In the shooting standby state in the recording mode in which the object image (through-the-lens image) is being displayed on the screen of the LCD display unit 6, the face recognition is repeated for every frame so as to focus the face of one person or faces of a plurality of persons designated among the persons registered in advance.

In that case, once the face of one person or faces of a plurality of persons designated are recognized, then the face recognition conditions are changed to reduce the face recognition accuracy for subsequent frames. It is thereby possible to accelerate the face recognition speed while ensuring the substantial face recognition degree. Namely, if the photographing and the recognition process are continuously performed at relatively short time intervals, there is high probability that the person recognized at certain photographing timing is present slightly at a different position in the photographic frame despite probable movement of the camera or person. Due to this, even if the person cannot be recognized as the same as the registered person with ordinary recognition accuracy because the direction of the face changes to follow the movement of the camera or the person and the difference is generated between the face and the registered front face, the probability of recognizing the person as the same as the registered person increases by reducing the recognition accuracy. Besides, in this case, the probability that the same person is present in the photographic frame is high. Due to this, even if the recognition accuracy is reduced, the probability that the person is erroneously recognized as another person decreases. In this case, if the face that can be recognized so far cannot be recognized at an arbitrary timing, then the face recognition conditions can be changed at the timing to increase (return) the face recognition accuracy for subsequent frames. Nonetheless, even if the direction of the face greatly changes from the registered direction of the face or the face is deviated from within the photographic frame and cannot be recognized, it is highly likely that the direction of the face instantly returns to the original direction or the face returns within the photographic frame. Therefore, the recognition accuracy can be kept reduced only for a predetermined time.

In the present embodiment, the digital camera can selectively photograph front faces by setting directions of faces to be registered only to the front direction. However, if faces including not only front faces but also faces photographed from a plurality of directions such as from 30-degree diagonally right, a person designated while faces of the person include faces in various directions can be selectively photographed. Further, in this case, if the process of reducing recognition rates in second and following photographic operations is performed as described in the embodiment, a face in a range from the front direction to 10-degree diagonally right direction and a range from 20-degree diagonally right direction to 30-degree diagonally right direction can be recognized at an ordinary recognition rate. Nevertheless, even if a face in a range from 10-degree diagonally right direction to 20-degree diagonally right direction cannot be recognized, a face in a wider range including the range from 10-degree diagonally right direction to 20-degree diagonally right direction can be recognized by reducing the recognition rate. Besides, the probability of the face recognition of recognizing the person as another person can be suppressed low.

In the present embodiment, if a specific person is recognized in the previous recognition process, the recognition accuracy in the next recognition process is reduced. In this case, by reducing the recognition accuracy for all of a plurality of candidates of registered faces corresponding to the personal ID of the specified person, it is effective if a specific person is selectively photographed in various photographing situations. However, if a plurality of candidates of registered faces corresponding to the same person is not particularly grouped according to the personal ID, the recognition accuracy can be reduced only during determination of degree of matching with the registered face having the highest previous degree of matching among these candidates of registered faces or the recognition accuracy can be reduced for registered faces of all the persons including the other persons than the specified person.

The embodiment of the present invention is suited for a case that the face of a person registered in advance is set as a recognition target and in which a plurality of similar persons is identified (is subjected to object identification). Alternatively, the embodiment of the present invention can be applied to a case of setting not the face of a specific person but faces of ordinary persons as recognition targets.

In the embodiment of the present invention, the digital camera including the image recognition processing unit 8 performing face detection and face recognition including object identification is shown. Alternatively, the image recognition processing unit 8 can be dispensed with and the control unit 3 can be set to perform the image recognition process according to a predetermined image recognition program.

While an example of applying the present intention to the digital camera having ordinary configuration has been described, the present invention is not limited to this, and is also applicable to a digital camera included in another information device such as a portable telephone terminal or to an arbitrary image recognition device as long as the image recognition device performs image recognition including object identification.

The case that the target of the image recognition including the object identification is the face of a person has been described so far. However, the present invention is not limited to this case, and is also effective if the image recognition including individual recognition is repeatedly performed with matter other than faces of persons as targets.

What is claimed is:

1. An image recognition device for performing image recognition including object identification on each of a plurality of continuously input images, comprising:
   a recognition unit which sets a plurality of faces registered in advance as recognition candidates, and which recognizes a specific recognition target registered in advance which matches with one of the recognition candidates in each of the continuously input images according to a predetermined recognition condition; and
   a recognition condition changing unit which changes a content of the predetermined recognition condition in response to recognition of the specific recognition target by the recognition unit in one of the continuously input images.

2. An image recognition device according to claim 1, wherein the faces registered in advance as the recognition candidates are different in a photographing condition for a same person.

3. An image recognition device according to claim 2, wherein the recognition condition changing unit changes a content of a recognition condition used in a matching determination with each of the plurality of recognition candidates corresponding to a specific person recognized by the recognition unit among the recognition candidates corresponding to a plurality of persons in response to the recognition of the specific person by the recognition unit.

4. An image recognition device for performing image recognition including object identification on each of a plurality of continuously input images, comprising:
   a recognition unit which recognizes a specific recognition target registered in advance from each of the continuously input images according to a predetermined recognition condition; and
   a recognition condition changing unit which changes a content of the recognition condition for a predetermined time in response to recognition of the specific recognition target by the recognition unit in one of the continuously input images, and which then returns the content of the recognition condition to an original content of the recognition condition;
   wherein the recognition unit includes an acquisition unit which compares a predetermined image part in each of the continuously input images with each of a plurality of registered images corresponding to each of a plurality of recognition candidates, and which acquires a degree of matching between the predetermined image part and each of the plurality of registered images, and the recognition unit determines whether or not the image recognition of the specific recognition target succeeds based on the degree of matching acquired by the acquisition unit;
   wherein the predetermined recognition condition includes a plurality of registered images serving as comparison targets used when the acquisition unit acquires the degree of matching between the predetermined image part and each of the plurality of registered images; and
   wherein the recognition condition changing unit changes the recognition condition so as to limit the comparison targets to ones of the registered images for which the degree of matching, acquired by the acquisition unit, is equal to or higher than a predetermined value in response to the recognition of the specific recognition target by the recognition unit in one of the continuously input images.

5. An image recognition device according to claim 4, wherein the predetermined recognition condition used when the recognition unit recognizes the predetermined recognition target further includes a criterion used when the recognition unit determines whether or not the recognition of the predetermined recognition target succeeds based on the degree of matching acquired by the acquisition unit, and the recognition condition changing unit reduces the criterion in response to the recognition of the specific recognition target by the recognition unit.

6. An image recognition device according to claim 4, wherein the recognition unit further includes a detection unit which detects a specific region corresponding to an object part equal in type to the plurality of recognition candidates from the continuously input images; and
   wherein the acquisition unit sets the specific region detected by the detection unit as the predetermined image part, compares the predetermined image part with each of the plurality of registered images corresponding to each of the plurality of recognition candidates, and acquires the degree of matching between the predetermined image part and each of the plurality of registered images.

7. An image recognition device according to claim 4, further comprising:
   a storage unit which stores the plurality of registered images corresponding to each of the plurality of recognition candidates.

8. An image recognition device according to claim 7, further comprising:
   an image pickup unit which continuously picks up an image of an object,
   wherein the acquisition unit compares a predetermined image part in the image of the object continuously picked up by the image pickup unit with each of the plurality of registered images stored in the storage unit, and acquires the degree of matching between the predetermined image part and each of the plurality of registered images.

9. An image recognition device according to claim 8, further comprising:
   an image acquisition unit which acquires an image of an object part to be used as one of the plurality of recognition candidates from the image of the object picked up by the image pickup unit; and
   a registration unit storing the image acquired by the image acquisition unit in the storage unit as a new registered image.

10. An image recognition device according to claim 9, further comprising:
    a processing unit which performs a plurality of types of different processes on the image acquired by the image acquisition unit,
    wherein the registration unit stores a plurality of types of images based on the image acquired by the image acquisition unit and subjected to the plurality of types of different processes by the image acquisition unit in the storage unit as new registered images.

11. An image recognition device for performing image recognition including object identification on each of a plurality of continuously input images, comprising:
    a recognition unit which recognizes a specific recognition target registered in advance from each of the continuously input images according to a predetermined recognition condition; and
    a recognition condition changing unit which changes a content of the predetermined recognition condition in response to recognition of the specific recognition target by the recognition unit in one of the continuously input images, wherein the recognition unit includes (i) an extraction unit which extracts a plurality of feature points from a predetermined image part in each of the continuously input images, and (ii) an acquisition unit which compares the predetermined image part with a registered image corresponding to the specific recognition target, and which acquires a degree of matching between the predetermined image part and the registered image for the plurality of feature points extracted by the extraction unit, and the recognition unit determines whether or not the image recognition of the specific recognition target succeeds based on the degree of matching acquired by the acquisition unit;

wherein the predetermined recognition condition includes a number of the plurality of feature points extracted by the extraction unit from the predetermined image part in each of the continuously input images; and wherein the recognition condition changing unit decreases the number of the plurality of feature points in response to the recognition of the specific recognition target by the recognition unit.

12. An image recognition device according to claim 11, wherein the acquisition unit compares the predetermined image part with each of a plurality of registered images corresponding to each of a plurality of recognition candidates, and acquires a degree of matching between the predetermined image part and each of the registered images for the plurality of feature points extracted by the extraction unit.

13. An image recognition device according to claim 11, wherein the acquisition unit compares the predetermined image part with each of a plurality of registered images corresponding to each of a plurality of recognition candidates, and acquires a degree of matching between the predetermined image part and each of the registered images for the plurality of feature points extracted by the extraction unit;

wherein the predetermined recognition condition further includes a number of the registered images serving as comparison targets used when the acquisition unit acquires the degree of matching between the predetermined image part and each of the registered images; and wherein the recognition condition changing unit changes the recognition condition so as to limit the comparison targets to ones of the registered images for which the degree of matching, acquired by the acquisition unit, is equal to or higher than a predetermined value, and decreases the number of the plurality of feature points in response to the recognition of the specific recognition target by the recognition unit.

14. A method of repeatedly performing image recognition including object identification on each of continuously input images comprising:

setting a plurality of faces registered in advance as recognition candidates;

recognizing a specific recognition target registered in advance which matches with one of the recognition candidates in each of the continuously input images according to a predetermined recognition condition; and changing a content of the predetermined recognition condition in response to recognition of the specific recognition target by the recognition unit in one of the continuously input images.

15. A non-transitory computer-readable medium recording a computer program executed by a computer included in an image recognition device for repeatedly performing image recognition including object identification on each of continuously input images, the program causing the computer to execute processes comprising:

setting a plurality of faces registered in advance as recognition candidates;

recognizing a specific recognition target registered in advance which matches with one of the recognition candidates in each of the continuously input images according to a predetermined recognition condition; and changing a content of the predetermined recognition condition in response to recognition of the specific recognition target by the recognition unit in one of the continuously input images.

* * * * *